US008457605B2

(12) United States Patent  (10) Patent No.: US 8,457,605 B2
Martinez et al.  (45) Date of Patent: Jun. 4, 2013

(54) METHOD FOR GENDER IDENTIFICATION OF A CELL-PHONE SUBSCRIBER

(75) Inventors: Vanessa Frias Martinez, Madrid (ES); Enrique Frias Martinez, Madrid (ES)

(73) Assignee: Telefonica, S.A. (ES)

( * ) Notice: Subject to any disclaimer, the term of this patent is extended or adjusted under 35 U.S.C. 154(b) by 209 days.

(21) Appl. No.: 12/897,351

(22) Filed: Oct. 4, 2010

(65) Prior Publication Data

US 2012/0083255 A1  Apr. 5, 2012

(51) Int. Cl.
*H04M 3/42* (2006.01)
*H04M 15/00* (2006.01)
*G06F 17/18* (2006.01)
*G06F 19/00* (2011.01)
*G06F 17/40* (2006.01)

(52) U.S. Cl.
USPC ........ 455/414.1; 379/111; 379/133; 379/134; 455/414.2; 702/179; 702/187

(58) Field of Classification Search
USPC ............ 379/133, 134, 140; 455/414.1, 414.2; 702/187, 179
See application file for complete search history.

(56) References Cited

U.S. PATENT DOCUMENTS

| | | | |
|---|---|---|---|
| 7,792,257 B1 * | 9/2010 | Vanier et al. | 379/114.13 |
| 2004/0254827 A1 * | 12/2004 | Hind et al. | 705/10 |
| 2007/0208728 A1 * | 9/2007 | Zhang et al. | 707/5 |
| 2008/0195387 A1 * | 8/2008 | Zigel et al. | 704/236 |

OTHER PUBLICATIONS

Ayesha Zainudeen, et al.; 2008; "Who's got the phone? The gendered use of telephones at the bottom of the pyramid"; In Annual meeting of the International Communication Association; pp. 1-26.
David Souter, et al.; "The Economic Impact of Telecommunications on Rural Livelihoods and Poverty Reduction: A Study of Rural Communities in India (Gujarat), Mozambique and Tanzania"; Commonwealth Telecommunications Organisation for UK Department for International Development; 2005; pp. 1-447.
Kathleen Diga, et al, "Mobile Cell Phones Poverty Reduction: Technology Spending Patterns and Poverty Level Change among Households in Uganda"; International Development Research Centre; Workshop on the Role of Mobile Technologies in Fostering Social Development, Jun. 2-3, 2008, Sao Paulo, Brazil; pp. 1-4.
Mark Turner, et al.; "Understanding emotions experienced when using a mobile phone in public: The social usability of mobile (cellular) telephones"; ScienceDirect; Telematics and Informatics 25 (2008), pp. 201-215.
Sophia Huyer, et al.; The Digital Diuide to Digital Opportunities, Women in the Information Society; Chapter 6, 2006; pp. 1-64.

* cited by examiner

*Primary Examiner* — Vladimir Magloire
*Assistant Examiner* — Edd Rianne Plata
(74) *Attorney, Agent, or Firm* — Cantor Colburn LLP

(57) ABSTRACT

The invention relates to a method for gender identification of a cell-phone subscriber. There are two main steps: constructing a general model of female and male calling behaviour from a set of variables obtained for each subscriber; and classifying an individual calling behaviour of a subscriber comparing it with the general model. The method includes the step of constructing the general model comprises obtaining a set of data, that may be obtained from calling detail records, that are saved at a database every time a subscriber makes or receives a phone call; computing a set of variables using a set of instances from subscribers who their gender is already known; and applying an algorithm which generates groups labelled as male or female behaviour. Finally, in the step of classifying, the gender of the subscriber is identified by assigning to the subscriber the label of the closest group.

9 Claims, 5 Drawing Sheets

METHOD FOR GENDER IDENTIFICATION OF A CELL-PHONE SUBSCRIBER

TECHNICAL FIELD OF THE INVENTION

The present invention relates to the technical field of gender identification and more specifically to the gender identification of cell-phone subscribers based on cell-phone calling behaviour.

BACKGROUND OF THE INVENTION

The pervasiveness of cell phones has made them an ideal platform for providing many services centred on improving local living conditions. For example SMSs have been used to inform women about prenatal care some countries. Similarly, have been offered HIV/AIDS and TB education, as well as awareness programs for men and women in South Africa via cell phones. This initiative resulted in an increase of 350% in the volume of calls to their hotline. While some of these programs offer gender-neutral solutions, it is clear that many applications would be implemented most effectively with prior knowledge of the gender of the person at the receiving end of the service.

Therefore, gender characterization and automatic gender identification raises as two of the most critical needs for improving cell phone-based services.

Gender characterization has been investigated by the human-computer interaction (HCI) and psychological communities. For instance, female cell phone users in the UK were found to be more comfortable than males making or receiving personal calls in different social contexts (Turner, M.; Love, S.; and Howell, M. 2008. Understanding emotions experienced when using mobile phone in public: "The social usability of mobile (cellular) phones. Telematics and Informatics 25(3):201-215). Similarly, research has demonstrated that males in West Africa tend to use cell phones for job-related tasks as opposed to females who tend to use them for personal calls (Huyer, et al. 2006. Women in the information society. In *From the Digital Divide to Digital Opportunities*).

The topic of gender identification (or gender classification) has been extensively studied by the computer vision and speech processing communities. Gender recognition methods that use images and voice to identify the gender of a person or face recognition technologies have already been developed.

From an algorithmic point of view, computer vision algorithms use high resolution images to figure out the gender of a person based on its facial features. These algorithms use as input databases of images labelled as male or female to build models that identify facial features that are unique to males or females. The models are then used as a black-box system to identify the gender of a person based on its facial picture. The algorithms used typically are general models like decision trees, neural networks or support vector machines (SVMs).

Similarly, speech recognition systems use the voice of a person to identify its gender. These systems typically use as input a database of pre-recorded conversations labelled as male or female. These pre-recorded conversations are then used as a training set to build a model that identifies voice features that can be uniquely associated to either male or female voices. The model is then used as part of a black-box system that receives as input a voice and outputs a gender label associated to that voice.

Hence, it is both through a better understanding of gender-related differences in the use of technology (gender characterization) and the correct identification of the gender of specific cell phone users (gender identification) that cell phone-based services can be improved. However, these techniques cannot be applied to cell phone networks mostly due to privacy concerns.

Other studies of mobile phone usage have revealed clear gender imbalances, as in Uganda (Diga, K. 2008. Technology spending patterns and poverty level change among households in Uganda. In *Workshop on the Role of Mobile Technologies in Fostering Social Development*). In particular, Diga has shown that there exists an unequal partner control and usage of the cell phone, specially inclined towards male ownership. Comparable results have been also obtained by Huyer, whose analysis examined the use of cell phones and internet in West Africa. These authors also found that men tend to use cell phones for professional or work-related tasks, while females favour social and personal calls. A recent study in India, Mozambique and Tanzania concluded that males use cell phones with a higher frequency than females, probably because of social norms and financial considerations (Souter et al. 2005. The economic impact of telecommunications on rural livelihoods and poverty reduction. In *Commonwealth Telecommunications Organization for UK Department for International Development*). In addition, the authors observed that men appear to regard cell phones more highly than women, particularly for business activities. Intriguingly, other studies have shown that the gender gap in cell phone usage is narrowing, with men and women reporting nearly identical calling behaviours. In a gender-based study of cell phone usage in Pakistan, India, Sri Lanka, Philippines and Thailand, Zainudeen showed that for all countries, except for Pakistan, women have similar call frequencies, call destinations and call durations as men (Zainudeen et al. 2008. Who's got the phone? the gendered use of telephones at the BOP. In Annual meeting of the International Communication Association).

Although these studies offer important insights that can be helpful towards gender characterization, such results are typically based on questionnaires applied to a limited amount of individuals. Taken together, previous research works highlight the existence of gender-based differences as well as similarities in calling behaviours. Nevertheless, such studies typically come from the field of psychology based on results that are usually derived from a limited number of personal interviews and/or questionnaires). However, these approaches for gender identification algorithms require access to the content of private conversations or private images, which in the context of cell phone networks is not feasible due to privacy concerns. In particular, speech recognition algorithms require access to the content of private conversations which would violate individual privacy rights unless the user specifically agrees to collaborate. Similarly, the use of pictures or images also suffers from being a very intrusive technique and only feasible if the cell phones are equipped with cameras. So a non-intrusive identification of the gender of a cell phone subscriber is needed.

SUMMARY OF THE INVENTION

The invention described on this paper aims to solve all the aforementioned problems by providing a non-intrusive method for the identification of the gender of a cell phone subscriber exclusively from features of the calls, such as the phone number, date, duration and location of a caller. So, this invention may use this kind of information for understanding and modeling user behaviour referring to gender identification.

Thus, this method for gender identification of a cell-phone subscriber comprises the steps of constructing a general model of female and male calling behaviour and classifying an individual calling behaviour of a subscriber comparing it with the general model.

The step of constructing the general model comprises the steps of obtaining a set of data from subscribers whose gender is already known, the set of data comprises features of a call (at least, phone number, date, duration and location of a caller, and other data on features of the call can be used), which can be obtained, for instance, from his/her Call Detail Records (CDRs). CDRs are generated every time a call is made or received and contain information about the date and duration of the call and location of the caller among others.

The next step is building an individual model P for the individual calling behaviour of each subscriber whose gender is already known, the individual model is built by computing a set of variables (p1, p2, ..., pn) from the set of data of each subscriber, whose gender is already known, defining a point of n-dimensions P(p1, p2, ..., pn). Next step is applying an algorithm to the individual models, which generates groups (of points) labelled as male behaviour or female behaviour. And the step of classifying also comprises the step of identifying the gender of the cell-phone subscriber by assigning to him the label of the closest group, being the closest group the one with the shortest Euclidean distance between the individual model of said subscriber and the mean of the individual models within the group.

The Euclidean distance between points p and q is the length of the line segment pq. In Cartesian coordinates, if p=(p1, p2, ..., pn) and q=(q1, q2, ..., qn) are two points in Euclidean n-space, then the distance from p to q is given by the Pythagorean formula.

The disclosed invention solves the privacy problems introduced by other approaches that use either voice or images. This method identifies gender by solely using CDRs from cell phone usage. Additionally, the method also includes an algorithm to compute general male and female behavior from a set of initial users whose gender is known.

Gender characterization has been widely investigated for many years by the HCI and the psychology communities with the use of questionnaires and personal interviews. However, the present invention allows to model large populations without the need to deploy questionnaires, since millions of calls with behavioral information are available. This invention constitutes a first of its kind and guarantees no violation of privacy since the information used to build the models is already saved by the companies for billing purposes.

DESCRIPTION OF THE DRAWINGS

To complement the description which is being made and for the purpose of aiding to better understand the features of the invention according to a preferred practical embodiment thereof, a set of drawings is attached as an integral part of this description, in which the following has been depicted with an illustrative and non-limiting character.

DETAILED DESCRIPTION

Here below a practical implementation in accordance to an embodiment of the invention are described.

The method proposed consists of two main parts: (I) computation of what constitutes general female and male calling behaviour, using an algorithm; and (II) using the general model to identify the gender of a subscriber by solely using its set of CDRs:

I. Gender Model:

This part focuses on computing a general model of female and male behaviour exclusively from calling detail records, CDRs, using an algorithm.

The step of constructing the general model may comprise a minimum percentage requirement of female and male instances of subscribers who their gender is already known, and the algorithm does not label groups under said minimum percentage requirement.

Figure 1:
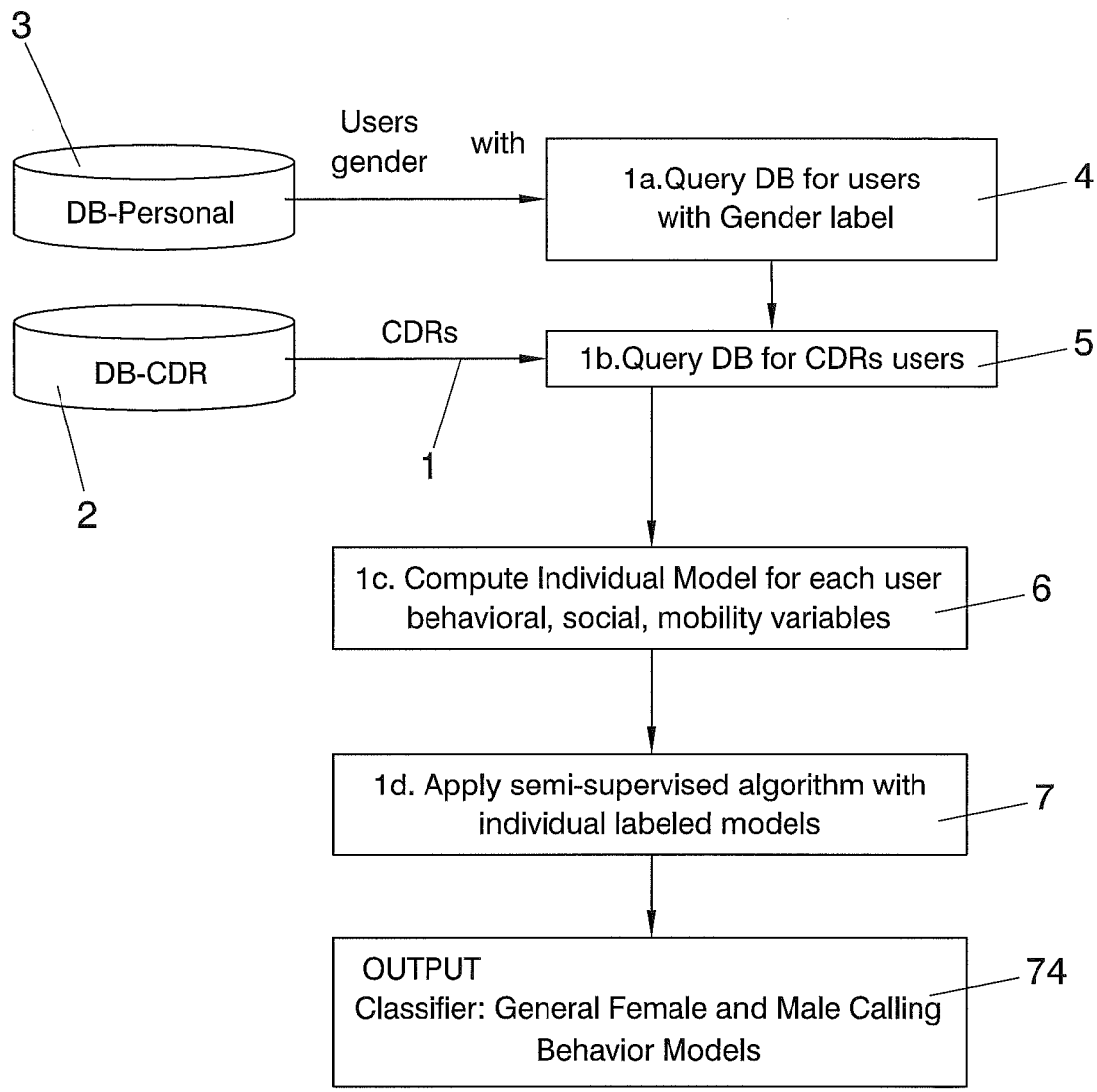
FIG. 1 shows a block diagram illustrating the computation of general female and male calling models.

Each subscriber from the initial set of subscribers whose gender is known is modelled by computing three variable sets from the CDRs: behavioural, social and mobility variables. These models are then used to compute a general female and male behaviour. This phase consists of four different steps, as shown in FIG. 1, and they are explained in more detail below.

I.i.—CDRs 1 are calling detail records that are saved every time a user makes or receives a phone call. Each CDR 1 contains the following information: phone number of the caller, phone number of the callee, time at which the call was made, duration of the call, geo-location where the call started and geo-location where the call ended. The geo-location is expressed as latitude-longitude and represents the geographical coordinates where the BTS that served the call is located. The CDRs 1 are saved at a database, DB-CDR 2, of calling records. Additionally, for each subscriber with a contract with the carrier, another DB-PERSONAL 3 with personal information (including gender for the subscribers with a contract) is maintained.

I.ii.—The DB-PERSONAL 3 is queried 4 to obtain all subscribers with a label for their gender. Once we have a set of labelled users, the DB-CDR is queried 5 to obtain all the CDRs for those users during the last t months. I.iii.—For each subscriber, and using all its CDRs extracted from the DB-CDR, we compute 6 three types of variables:

Behavioural Variables: for each user j in DB-PERSONAL, we measure the number of input calls IC, output calls OC, duration of the input calls IDUR, duration of the output calls ODUR and the expenses EP, throughout D months.

$$IC_j = \sum_{i=0}^{D} \text{incalls}(day_i, j)$$

$$IDUR_j = \frac{\sum_{i=0}^{IC_j} \text{duration}(incall_i, j)}{IC_j}$$

$$OC_j = \sum_{i=0}^{D} \text{outcalls}(day_i, j)$$

-continued $$ODUR_j = \frac{\sum_{i=0}^{OC_j} duration(outcall_i, j)}{OC_j}$$

$$EP_j = \frac{\sum_{i=0}^{D} expenses(day_i, j)}{IC_j + OC_j}$$

Social Variables: for each subscriber j, we measure their in-degree IDG or number of different cell phones that called subscriber j, their out-degree ODG or number of different cell phones subscriber j called to, and the degree DG defined as the cell phone numbers that were both present in IDG and ODG.

$$IDG_j = |\cup_{i=0}^{IC_i} N_i| \quad ODG_j = |\cup_{i=0}^{OC_i} N_i|$$

$$DG_j = |(IDG_j \cup ODG_j)| - |(IDG_j \cap ODG_j)|$$

Mobility Variables: for each subscriber j in DB-PERSONAL, we measure the distances that the subscriber travels while he talks, Talk Distance or TDIST, or between calls, Route Distance or RDIST. Every time a call is placed or received, the CDR generated contains the latitude and longitude of the BTS where the call started and ended. From these data, we can compute the distance that the subscriber j travelled during each call as TDIST, or the distance the subscriber travels between calls as RDIST.

$$TDIST_j = \frac{\sum_{i=0}^{IC_j + OC_j} d(t_0(i), t_f(i))}{IC_j + OC_j}$$

$$RDIST_j = \frac{\sum_{i=0}^{IC_j + OC_j} d(t_f(i-1), t_0(i))}{IC_j + OC_j}$$

These three groups of variables constitute a typical individual model of a subscriber, where it is computed the average value of each variable for all the D months of CDRs used.

I.iv.—Finally, it is proposed an algorithm to the group of individual models and defined what constitutes typical female or male behaviour. In FIG. 1, this algorithm is represented 7. The individual steps are explained in detail in FIG. 2 as follows:

1. Applies k-means 71 to divide the individual models of the
   subscribers into different groups. In our case, k-means will distribute the calling behaviours into k groups.
2. Labels each resulting group c with a female or male tag 72, based on a minimum percentage requirement p of female or male-labelled instances within the group.

Higher values of p guarantee more precise definitions of female or male behaviour since each group would consist of a large number of instances of a particular gender. In contrast, lower values of p would produce fuzzier behavioural definitions since the groups contain more even mixtures of female and male instances. It is important to note that the algorithm does not label groups that fail to reach the minimum percentage requirement p.

3. Finalizes the definition of the model by computing 73 a radius for each labelled group. This radius is given by the maximum distance between a calling behaviour in group c and the centroid of the group.
4. Builds the final gender general model 74 using only groups that have been labelled female or male.

These groups are the model of what constitutes female and male behaviour for the gender classification algorithm.

At the end of step I, the method outputs a general model i.e., a definition of general male and female calling behaviour. This general model is represented in FIG. 1 and in more detail in FIG. 2. The general model represents a behavioural model that it is used every time a carrier needs to identify the gender of a specific subscriber. Thus, step II is run every time gender identification is needed.

II. Identifying Gender

Figure 3:
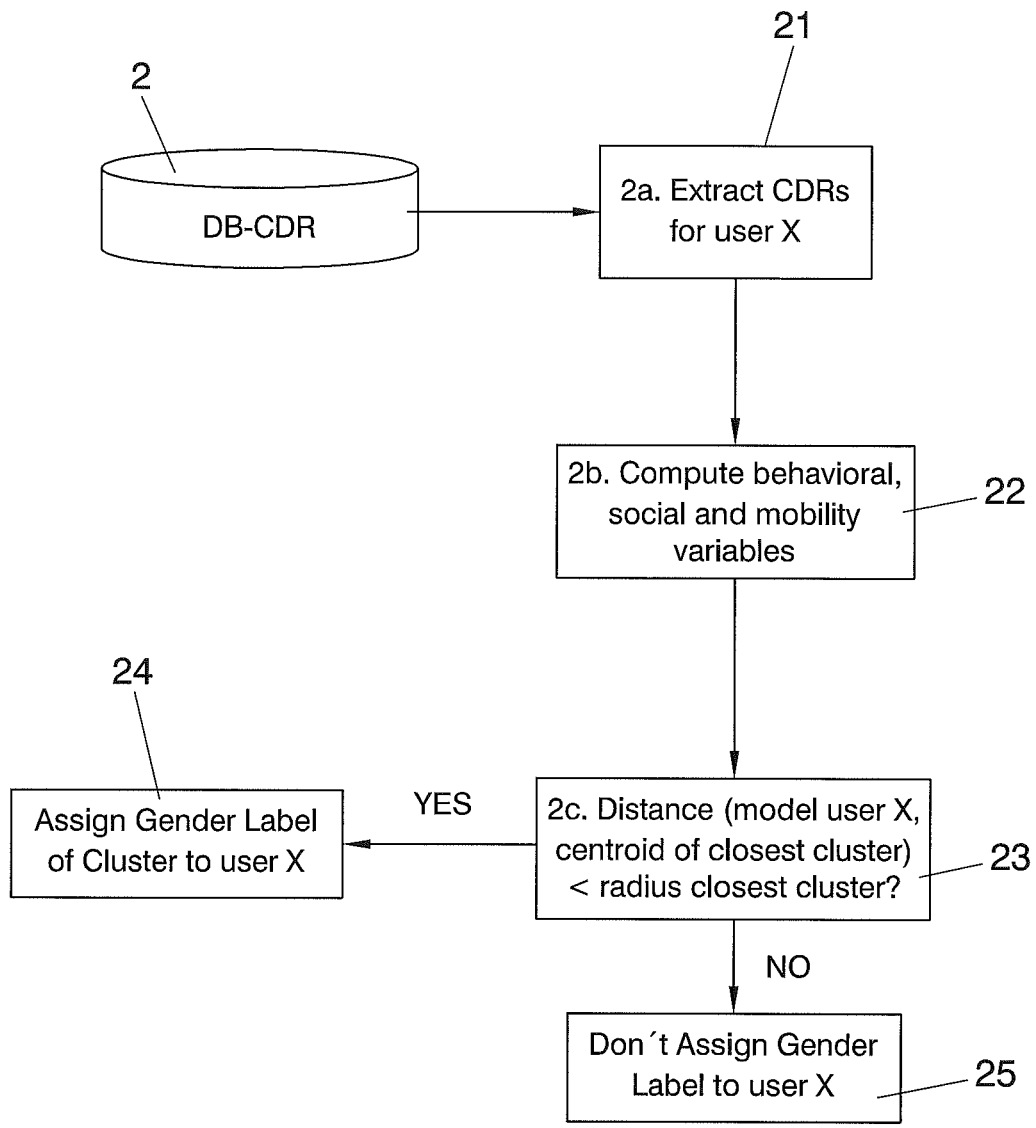
FIG. 3 shows a block diagram illustrating how to identify the gender of a subscriber from his CDRs.

The gender general model is executed by the method here presented, whenever a carrier needs to identify the gender of subscribers whose gender is unknown. Using the general gender female and male models obtained in step I, the following steps are taken to identify the gender of a subscriber, they are represented in FIG. 3:

II.i.—Retrieve 21 from DB-CDR 2 all the CDRs for that subscriber for the last D months.

II.ii.—Compute 22 the behavioural, social and mobility variables using the CDRs. This set of variables constitutes the individual model of the subscriber.

II.iii.—The method finds 23 the closest labelled group c to the individual model. If the distance between the model and the centroid of group c is less or equal than the group's radius, the subscriber is assigned 24 the gender label of that group. Otherwise, no gender prediction 25 is provided due to the lack of sufficient gender certainty in the classification algorithm. Therefore, the classification algorithm sacrifices the coverage of the classification, as percentage of classified instances, in order to improve its accuracy, as percentage of correctly classified instances.

Distances are Euclidean distances. The Euclidean distance between points p and q is the length of the line segment pq. In Cartesian coordinates, if p=(p1, p2, . . . , pn) and q=(q1, q2, . . . , qn) are two points in Euclidean n-space, then the distance from p to q is given by the Pythagorean formula.

An individual model is a point P defined by a set of variables (p1, p2, . . . , p3).

The centroid of a group is obtained as the mean of the individual models within the group.

The radius of a group is obtained as the Euclidean distance between a centroid and an individual model.

Self-Calibration of the Algorithm

The algorithm automatically computes the best values for k, the number of groups, and p, percentage of labelled samples, that achieve the best classification rates. The algorithm runs a cross-validation phase 85, represented in FIG. 4A, which computes for each combination of k and p, the coverage and the accuracy of the method for a set of testing samples. Depending on the nature of the sample, the algorithm adjust and find different p and k values 84 to be optimal, based on the bounds for accuracy and coverage set up by the user of the method here presented. The bounds set up by the user act as a knob in the results: the higher the accuracy, the lower the coverage and vice versa.

Figure 2:
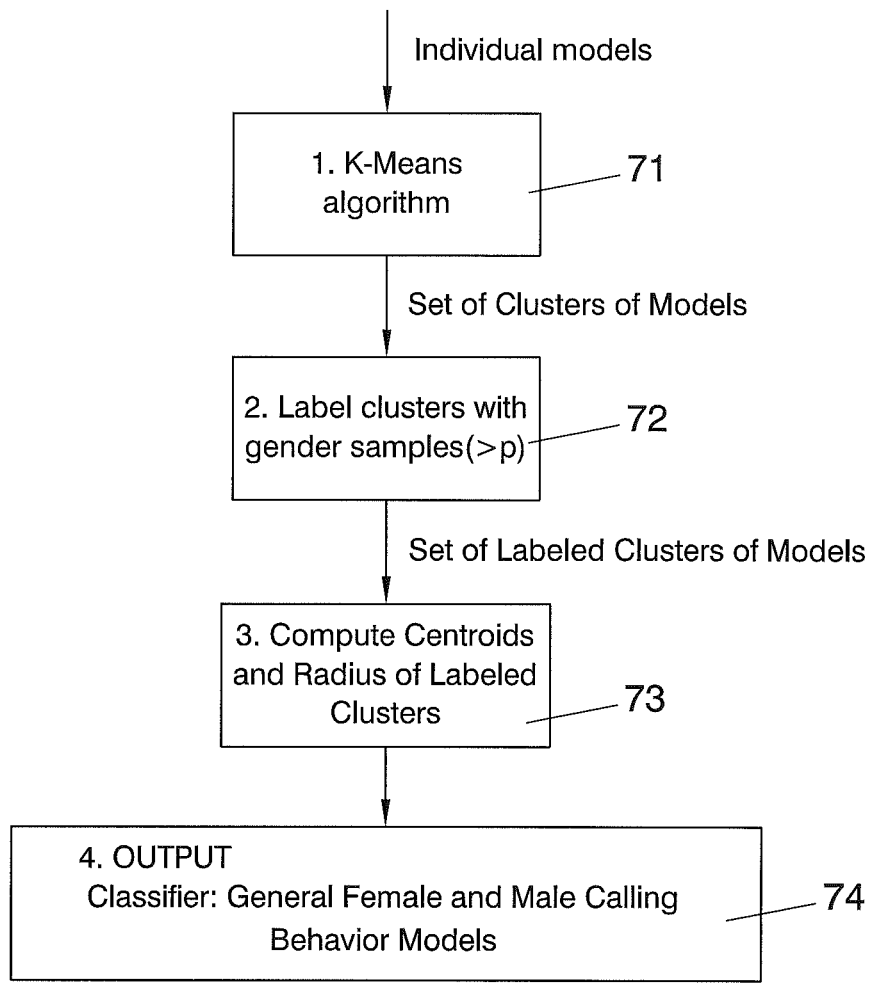
FIG. 2 shows a block diagram comprising the steps of the algorithm to compute general female and male calling behaviour.
Figure 4A:
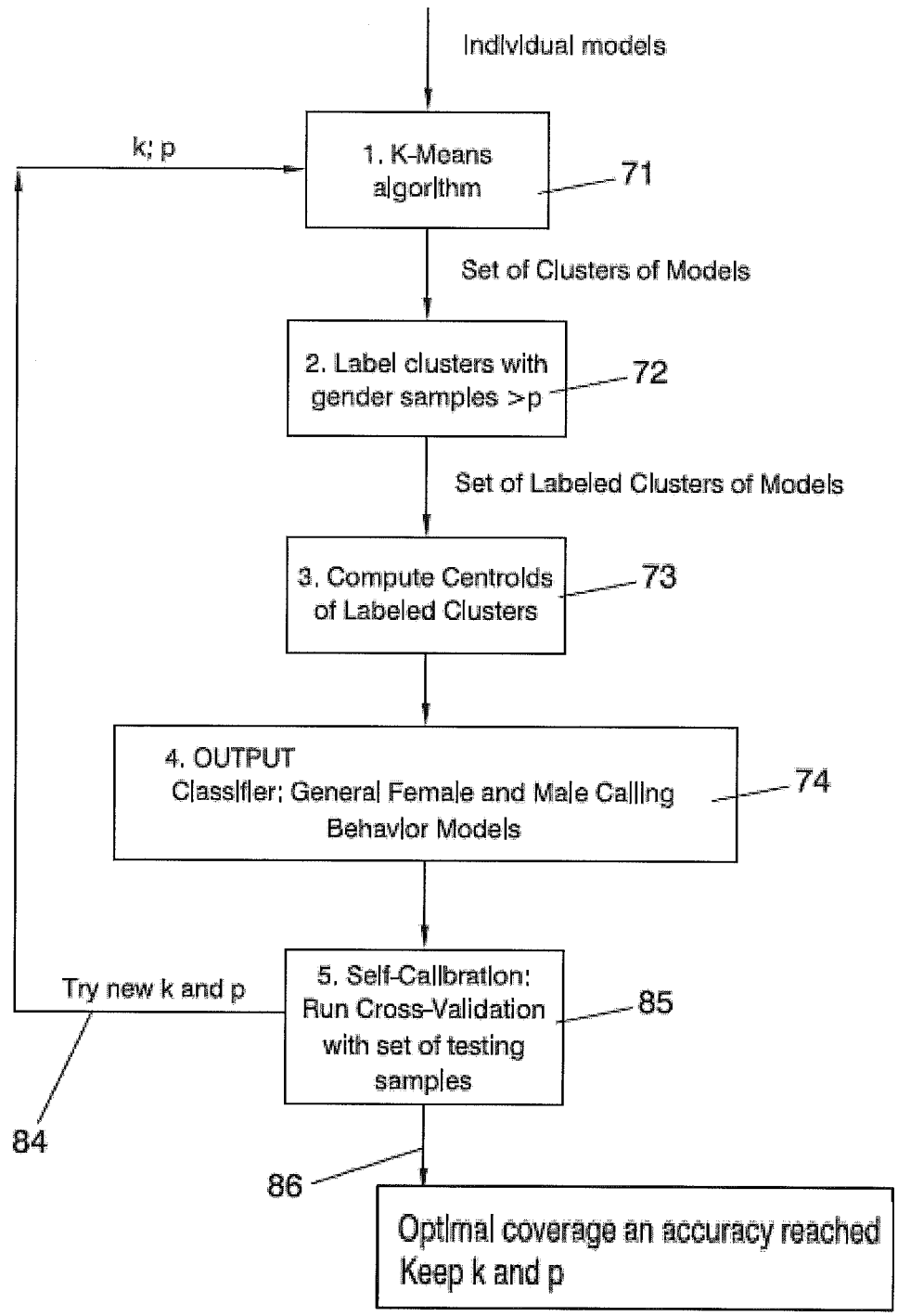
FIG. 4A shows a block diagram comprising the cross validation phase to illustrate the cross validation phase.

FIG. 4A represents the self-calibration algorithm: the self calibration runs the same steps as in FIG. 2 to build the general female and male calling behaviour model. However, the model is computed several times for different values of p and k until the accuracy and coverage is reached 86. The final output is the model used to identify the gender of subscriber's with unknown label.

Figure 4B:
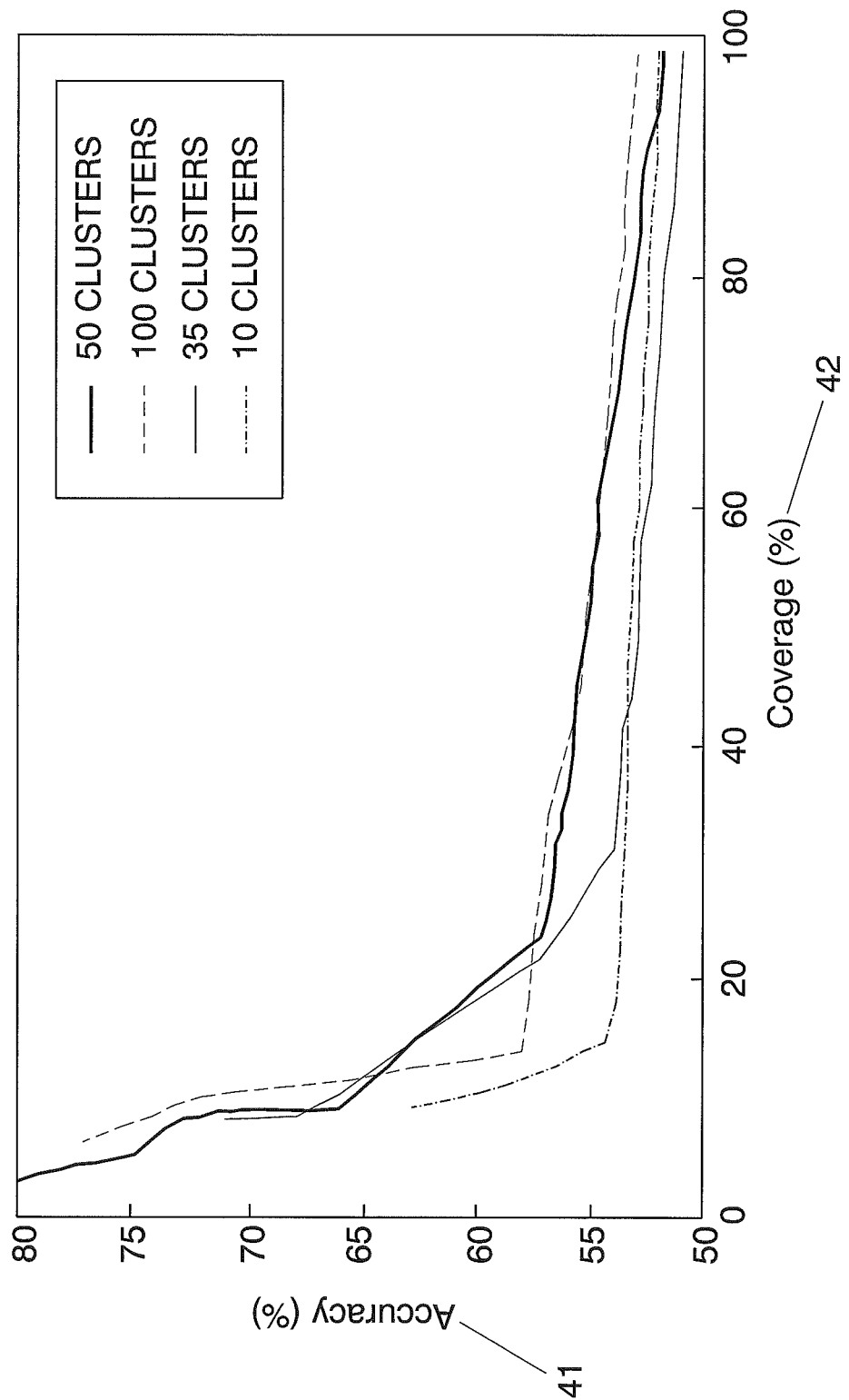
FIG. 4B shows a chart illustrating parameter results of the preferred embodiment of the invention.

FIG. 4B shows the exploration that the algorithm does across different k values as well as p values. Each line represents a different k value, and for each line, the pair accuracy-coverage is computed for different values of p from 90% to 55%. For example, if the user of this method wants to obtain accuracy 41 higher than 70% and coverage 42 larger than 10%, the algorithm would automatically select 50 groups and p=80%.

The invention disclosed solves the privacy problems introduced by other approaches that use either voice or images. This method identifies gender by solely using CDRs from cell phone usage. Additionally, the method also includes an algorithm to compute general male and female behaviour from a set of initial users whose gender is known.

Gender characterization has been widely investigated for many years by the HCI and the psychology communities with the use of questionnaires and personal interviews. However, the present invention allows modeling large populations without the need to deploy questionnaires, since millions of calls with behavioural information are available in the CDRs. No specific studies on gender identification from CDR data have been carried out so far. This invention constitutes a first of its kind and guarantees no violation of privacy since the information used to build the models is already saved by the companies for billing purposes.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. Method for gender identification of a cell-phone subscriber comprising
the steps of:
constructing a general model of female and male calling behaviour;
classifying an individual calling behaviour of a subscriber comparing it with the general
model;
characterized in that:
the step of constructing the general model comprises:
obtaining a set of data from subscribers whose gender is already known, the data comprises features of a call, which comprises phone number, date, duration and location of a caller;
building an individual model P for the individual calling behaviour of each subscriber
whose gender is already known, the individual model is built computing a set of variables
p1, p2, . . . . ,pn, from the set of data of each subscriber, whose gender is already known, defining a point of n-dimensions P(p1, p2, . . . . ,pn) and,
applying an algorithm to the individual model of each subscriber, which generates groups labelled as male behaviour or female behaviour;
wherein the algorithm comprises the following steps:
applying a K-means algorithm to divide the individual models into k groups in which each individual model belongs to the group with the nearest mean, calculated as the Euclidean distance to the mean of the individual models that are already within the group,
computing a radius for each labelled group as the maximum Euclidean distance between the centroid and an individual model, being the centroid the mean of the individual models within the group and
building the general model using the labelled groups;
and the step of classifying comprises:
identifying the gender of the cell-phone subscriber by assigning to him the label of the closest group, being the closest group the one with the shortest Euclidean distance between the individual model of said subscriber and the mean of the individual models within the group.

2. The method according to claim 1 wherein the set of data is obtained from calling detail records, which are computer records produced by a telephone exchange, containing details of a call, that are saved at a database every time a subscriber makes or receives a phone call.

3. The method according to claim 1 wherein the general model is constructed using only groups that satisfy a minimum percentage requirement of female and male subscribers whose gender is already known, and the algorithm labels groups which exceed said minimum percentage requirement.

4. The method according to claim 3 wherein the algorithm runs a cross-validation phase to select the best values of minimum percentage requirement and number of groups, computing the general model several times, changing the values of minimum percentage requirement and number of groups, until reach the values set up previously.

5. The method according to claim 1 wherein the set of data comprises: phone number of the caller, phone number of the callee, time at which the call is made, duration of the call, geo-location where the call starts and geo-location where the call ends.

6. The method according to claim 1 wherein the set of variables to compute for a subscriber comprises: number of input calls, number of output calls, duration of the input calls, duration of the output calls, expenses, number of different cell phones called, number of different cell-phones called to, number of different cell-phones both called and called to, distance that the subscriber travels during a call, and distance that the subscriber travels between calls.

7. The method according to claim 1 wherein the step of identifying the gender of a subscriber further comprises the following steps:
obtaining the set of data for the subscriber;
building the individual model for the subscriber computing the set of variables from the set of data of said subscriber;
finding the closest labelled group to the individual model of the subscriber, being the closest labelled group the one whose centroid have the shortest Euclidean distance to the individual model.

8. The method according to claim 7 further comprising assigning the gender label of the closest labelled group to the subscriber.

9. The method according to claim 7 further comprising assigning the gender label of the closest group to the subscriber if the distance between the individual model and the centroid of the closest group is less or equal than the radius of said closest group.

* * * * *